(12) United States Patent
Fujioka

(10) Patent No.: US 8,100,159 B2
(45) Date of Patent: Jan. 24, 2012

(54) PNEUMATIC TIRE WITH CIRCUMFERENTIAL MAIN GROOVES HAVING PROTRUSIONS

(75) Inventor: Tsuyoshi Fujioka, Osaka-fu (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 1114 days.

(21) Appl. No.: 11/867,824

(22) Filed: Oct. 5, 2007

(65) Prior Publication Data

US 2008/0093000 A1 Apr. 24, 2008

(30) Foreign Application Priority Data

Oct. 24, 2006 (JP) .................... 2006-288276
Oct. 24, 2006 (JP) .................... 2006-288277

(51) Int. Cl.
*B60C 11/04* (2006.01)
*B60C 11/12* (2006.01)
*B60C 11/13* (2006.01)

(52) U.S. Cl. .............. 152/209.21; 152/DIG. 3; 152/900; 152/901

(58) Field of Classification Search ............. 152/209.21, 152/209.24, DIG. 3, 900, 901
See application file for complete search history.

(56) References Cited

U.S. PATENT DOCUMENTS

| | | | |
|---|---|---|---|
| 4,114,671 A * | 9/1978 | Maiocchi et al. | 152/209.21 |
| 4,423,760 A * | 1/1984 | Treves et al. | 152/209.21 |
| 4,865,099 A * | 9/1989 | Goergen | 152/209.21 |
| 4,955,415 A * | 9/1990 | Takeuchi et al. | 152/209.21 |
| 5,535,798 A * | 7/1996 | Nakamura | 152/209.21 |
| 6,196,288 B1 * | 3/2001 | Radulescu et al. | 152/DIG. 3 |
| 6,488,064 B1 * | 12/2002 | Radulescu | 152/DIG. 3 |

FOREIGN PATENT DOCUMENTS

| | | | |
|---|---|---|---|
| EP | 227322 | * | 7/1987 |
| JP | 05-065609 | | 8/1993 |
| JP | 09-011708 | * | 1/1997 |
| JP | 2001-030718 | | 2/2001 |
| JP | 2002-293110 | | 10/2002 |
| JP | 2004224143 A | | 8/2004 |

OTHER PUBLICATIONS

Machine translation for Japan 09-011708 (no date).*
Chinese Office Action for Application No. 200710154620.0, dated Oct. 8, 2010, 4 pages.
Office Action for Japanese Application No. 2006-288276 dated Aug. 9, 2011 (with English translation).

* cited by examiner

*Primary Examiner* — Steven D Maki
(74) *Attorney, Agent, or Firm* — Fish & Richardson P.C.

(57) ABSTRACT

In the pneumatic tire in which not less than three main grooves 1 extending in the tire circumferential direction R are formed and ribs 2 are formed by the main grooves 1, upper edges 11 of the main groove 1 when the tire is new extend in a linear manner in the tire circumferential direction R, the bottom 12 of the main groove 1 extends in a zigzag manner in the tire circumferential direction R, the sidewalls 13 of the main groove 1 is provided with concave portions and convex portions, and in the concave portion of at least one of the sidewalls 13 of the main groove 1, the protrusions 3 that is joined to the bottom 12 of the main groove 1 and to the sidewall 13. Further, the pneumatic tire may be provided with sipes or notches that extend from the concave portion to the inner side of the rib 2 in the tire width direction.

13 Claims, 5 Drawing Sheets

PNEUMATIC TIRE WITH CIRCUMFERENTIAL MAIN GROOVES HAVING PROTRUSIONS

The description of this application claims benefit of priorities based on Japanese Patent Application No. 2006-288276 and Japanese Patent Application No. 2006-288277, the entire same contents of which are incorporated by reference herein.

BACKGROUND OF THE INVENTION

1. Field of the Invention

The present invention relates to a pneumatic tire, and in more detail, the present invention relates to the pneumatic tire that inhibits the generation of so-called stone-biting, a phenomenon in which stones are caught in the tire grooves and cannot be removed, while securing the traction performance and the drainage performance.

2. Description of the Prior Art

In order to obtain desired performances including drainage performance, traction performance, braking performance, and the like, main grooves extending in the tire circumferential direction and transverse grooves extending in the tire width direction are formed on a tread. When stones are caught in the grooves and cannot be removed therefrom, sometimes the stones proceed in the direction of groove bottoms, thereby damaging the groove bottoms. When the stones proceed further into the grooves, belt layers and auxiliary belt layers are damaged, enhancing the risk of causing failure. In particular, main grooves are likely to be damaged since deformation of the grooves by tire rotation is little. In order to prevent such catching of stones, the pneumatic tire provided with protrusions (called stone ejectors) at the center in the bottom of the main grooves so that the stones do not proceed into the grooves is known (Patent document 1: Unexamined Japanese Laid-Open Patent Publication No. 2002-293110).

However, when the protrusions with heights capable of satisfactorily preventing the generation of the catching of stones are provided at the center in the bottom of the main grooves, the drainage performance of the main grooves get greatly degraded. Also, cracks are likely to occur at the joining portion between the protrusion and the groove bottom since the protrusion gets more deformable when the stones proceed into the grooves. Therefore, it has been difficult to realize both improvement in the drainage performance and prevention of the catching of stones.

Therefore, the object of the present invention is to prevent generation of the catching of stones, while maintaining the good drainage performance.

SUMMARY OF THE INVENTION

In order to solve the above mentioned problem, the present invention relates to a pneumatic tire with not less than three main grooves extending in the tire circumferential direction formed and ribs formed by the main grooves, wherein upper edges of the main groove when the tire is new extend in a linear manner in the tire circumferential direction, the bottom of the main groove extends in a zigzag manner in the tire circumferential direction, the sidewalls of the main groove are provided with concave portions and convex portions, and in the concave portions of at least one of the side walls of the main groove, the protrusions that are joined to the bottom of the main groove and to the sidewall are provided.

In addition, the present invention relates to a pneumatic tire with not less than three main grooves extending in the tire circumferential direction formed and ribs formed by the main grooves, wherein upper edges of the main groove when the tire is new extend in a linear manner in the tire circumferential direction, the bottom of the main groove extends in a zigzag manner in the tire circumferential direction, the sidewalls of the main groove are provided with concave portions and convex portions, in the concave portions of at least one of the sidewalls of the main groove, the protrusions that are joined to the bottom of the main groove and to the sidewall, and the pneumatic tire is provided with sipes that extend from the concave portion to the inner side of the rib in the tire width direction.

Further, the present invention relates to a pneumatic tire with not less than three main grooves extending in the tire circumferential direction formed and ribs formed by the main grooves, wherein upper edges of the main groove when the tire is new extend in a linear manner in the tire circumferential direction, the bottom of the main groove extends in a zigzag manner in the tire circumferential direction, the sidewalls of the main groove are provided with concave portions and convex portions, in the concave portions of at least one of the sidewalls of the main groove, the protrusions that are joined to the bottom of the main groove and to the sidewall, and the pneumatic tire is provided with notches that extend from the concave portion to the inner side of the rib in the tire width direction.

When the tire is new, since the main groove extends in the tire circumferential direction in a linear manner, the generation of uneven wear at the rib can be inhibited. Since the bottom of the main groove extends in a zigzag manner, as the wear progresses, due to the main groove's extending in the zigzag manner, the traction performance and the braking performance of the tire are improved. Also, when the protrusions appear on the tread surface as the wear progresses, due to the protrusions, the traction performance and the braking performance are improved.

Even when the stones are caught in the main groove, due to the protrusions, the stones can be inhibited from proceeding into the groove bottom direction, thereby capable of preventing the catching of stones. Further, since the protrusions are not continuous and are arranged with spaces, the drainage performance of the main groove is not damaged. Further, since the protrusions are joined to the sidewall, even when the stones proceed into, they are not deformed easily and therefore, no cracks are generated at the joining portion between the groove bottom and the protrusions.

The concave portions of the sidewalls of the main groove have higher rigidity compared with the convex portions thereof, and since the protrusions are further provided, the rigidity gets higher all the more. Therefore, by forming sipes or notches extending from the concave portion to the inner side of the rib in the tire width direction, the rigidity of the concave portions of the sidewalls is lowered to narrow the rigidity difference with that of the convex portions, thereby inhibiting the uneven wear.

The present invention relates to the pneumatic tire provided with the protrusions at both sidewalls of the main groove.

By providing protrusions at both sidewalls, the effect of preventing the catching of stones, the traction performance and the braking performance at the time of progressing wear are improved.

The present invention relates to the pneumatic tire, wherein the height H from the groove bottom of the protrusions is 10 to 40% of the depth D of the main groove.

When the height H from the groove bottom of the protrusions is less than 10%, sometimes, the effect of preventing the catching of stones is low, and when the height H exceeds 40% of the depth D, sometimes the drainage performance of the main groove is damaged.

The present invention relates to the pneumatic tire, in which W1 is defined the distance from the protrusion to the opposing sidewall in the groove bottom and W2 is defined the space between the adjacent protrusions in the groove bottom, the larger value between W1 and W2 is not greater than twice as the other value, the smaller value between W1 and W2 is 50 to 70% of the groove width W in the groove bottom except for the protrusions.

It is from the view point of securing the drainage performance of the main groove that W1 that is the distance from the protrusion to the opposing sidewall and W2 that is the space between the adjacent protrusions are set to be in specific ranges.

The present invention relates to the pneumatic tire, wherein the circumferential length L2 of the protrusions at the farther side from the sidewall is shorter than the circumferential length L1 of the protrusions at the near side from the sidewall.

From the view point of securing the drainage performance of the main groove, it is preferable to make L2 that is the circumferential length of the protrusion at the farther side from the sidewall of the protrusion shorter than L1 that is the circumferential length of the protrusion at the near side from the sidewall.

DESCRIPTION OF THE PREFERRED EMBODIMENTS

Figure 1:
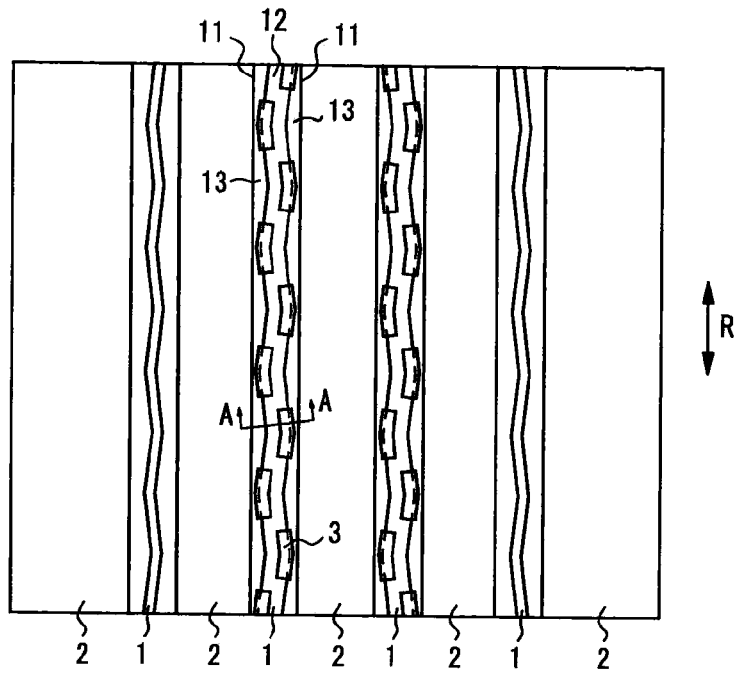
FIG. 1 is a schematic view showing the tread pattern of the pneumatic tire of the present invention when the tire is new.

Hereinafter, using figures, the explanation goes on for the embodiment for carrying out the pneumatic tire of the present invention. FIG. 1 is a schematic view showing the tread pattern of the pneumatic tire of the present invention when the tire is new. In the figure, ribs 2 are formed by the main grooves 1 that extend in the tire circumferential direction R. Upper edges 11 of the main grooves 1 when new extend in a linear manner in the tire circumferential direction R. On the other hand, the bottoms 12 of the main grooves 1 extend in a zigzag manner in the tire circumferential direction R. As a result, the generation of uneven wear at the ribs 2 from a time of a new product to the initial stage of wear can be inhibited. The traction performance and the braking performance are improved since the bottoms of the main grooves 1 extend in a zigzag manner thereafter.

Figure 2:
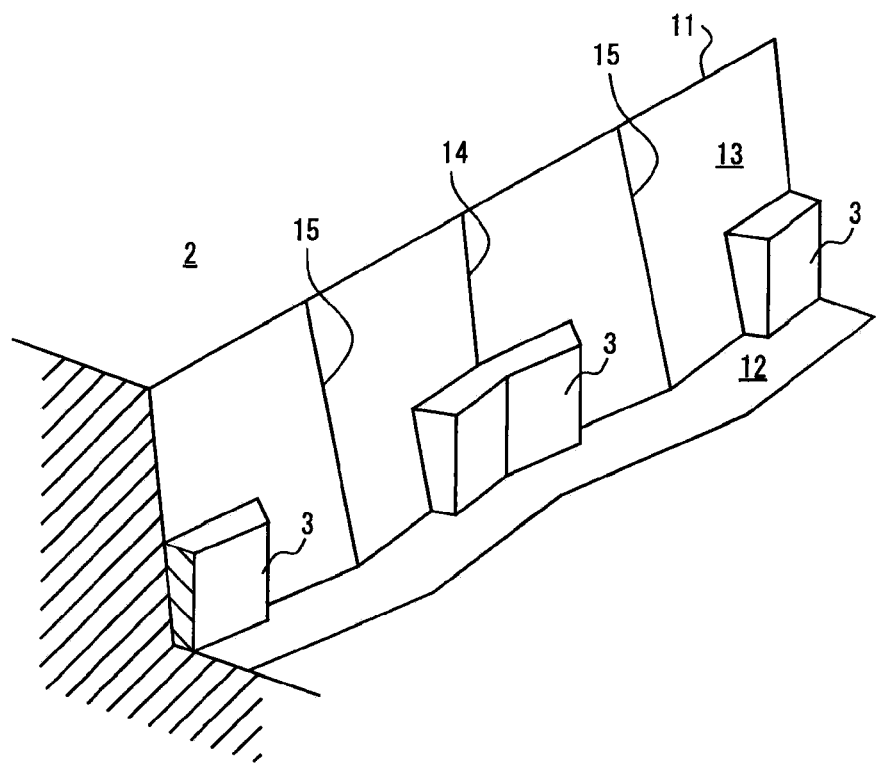
FIG. 2 is an oblique perspective view showing a part of the main groove in FIG. 1.

FIG. 2 is an oblique perspective view showing a part of the main groove. The sidewall 13 of the main groove 1 is provided with concave portions 14 and convex portions 15 alternately. In the concave portions 14, the protrusions 3 that are joined to the bottom 12 of the main groove 1 and to the sidewall 13 is provided. Therefore, even when a stone should be caught in the main groove 1, the stone can be inhibited from proceeding into the groove by the protrusions 3, thereby capable of preventing the catching of stones. In addition, since the protrusions 3 are not continuous and are arranged with spaces provided, the drainage performance of the main grooves 1 cannot be damaged.

Since the protrusions 3 are joined to the sidewall 13, no crack is generated at the joining portion of the groove bottom 12 and the protrusions 3. As the wear progresses and when the protrusions 3 appear on the tread surface, the traction performance and the braking performance are improved by the protrusions 3. For information, although the protrusions 3 may be provided at least one sidewall 13, they may be provided at both sidewalls 13.

Figure 3:
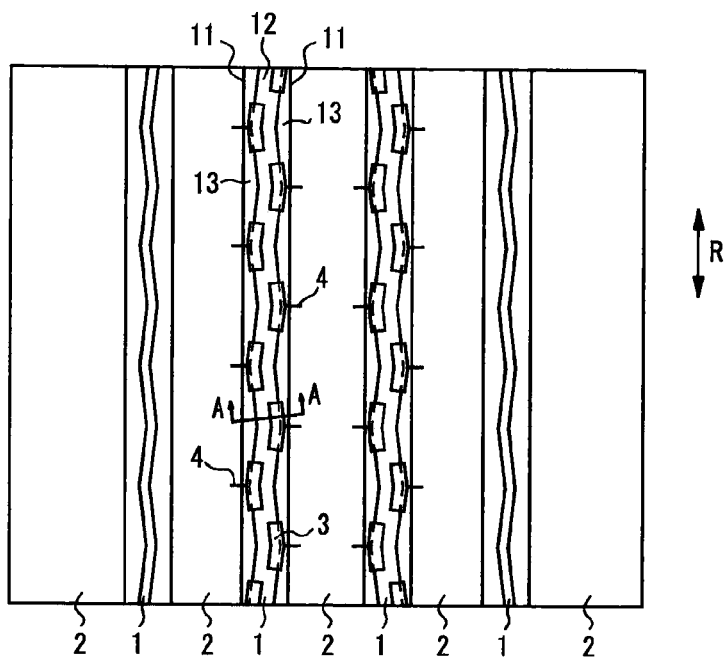
FIG. 3 is a schematic view showing the tread pattern of the pneumatic tire of the present invention when the tire is new.
Figure 4:
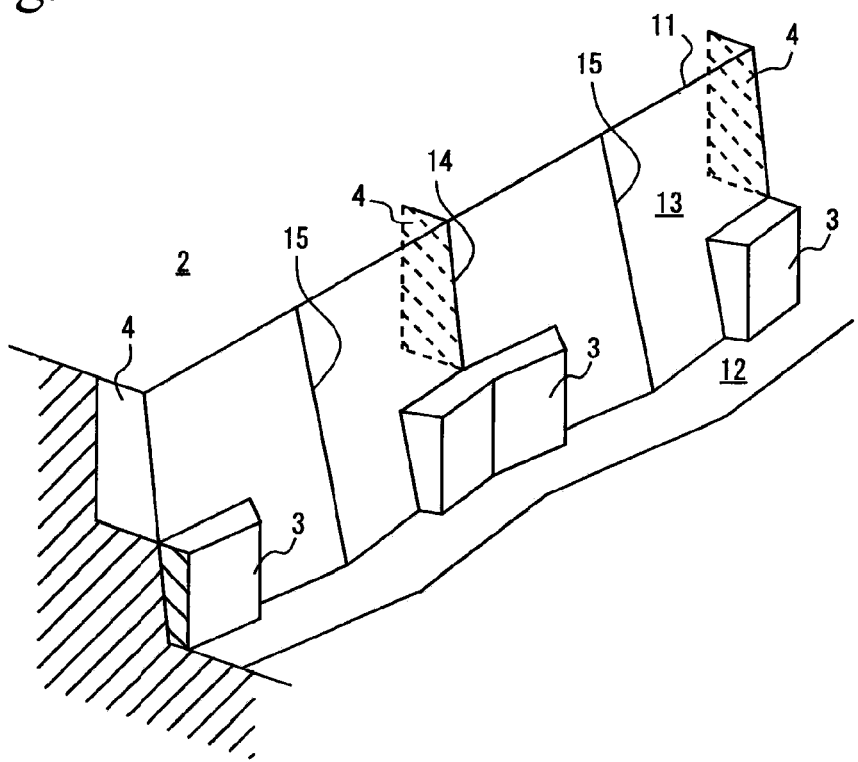
FIG. 4 is an oblique perspective view showing a part of the main groove in FIG. 3.

FIG. 3 is a schematic view showing the tread pattern of the pneumatic tire when the tire is new in another embodiment and FIG. 4 is an oblique perspective view showing a part of the main groove. Although the operational effect of the protrusions 3 is just like that observed in the tires of FIGS. 1 and 2, the sipes 4 extending from the concave portion 14 of the sidewall 13 to the inner side of the rib 2 in the tire width direction are formed. By the sipes 4, the rigidity of the concave portions 14 of the sidewall 13 with improved rigidity by the protrusions 3 is lowered. As a result, the difference in the rigidity between the concave portions 14 and the convex portions 15 of the sidewall 13 becomes smaller, which can inhibit the uneven wear. For information, it is preferable that the depth of the sipes 4 is the depth that can reach to the protrusions 3 and that the length of the sipes 4 is 5 to 15% of the width of the rib 2. When the sipes 4 are too short, the effect of narrowing the rigidity difference between the concave portions 14 and the convex portions 15 is small. On the other hand, when the sipes 4 are too long, the rigidity of the concave portions 14 becomes too small.

Figure 5:
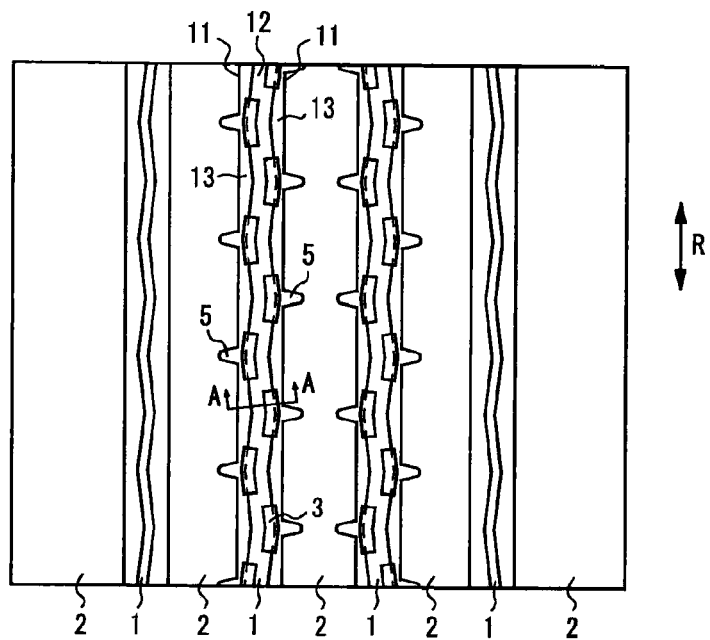
FIG. 5 is a schematic view showing the tread pattern of the pneumatic tire of the present invention when the tire is new.
Figure 6:
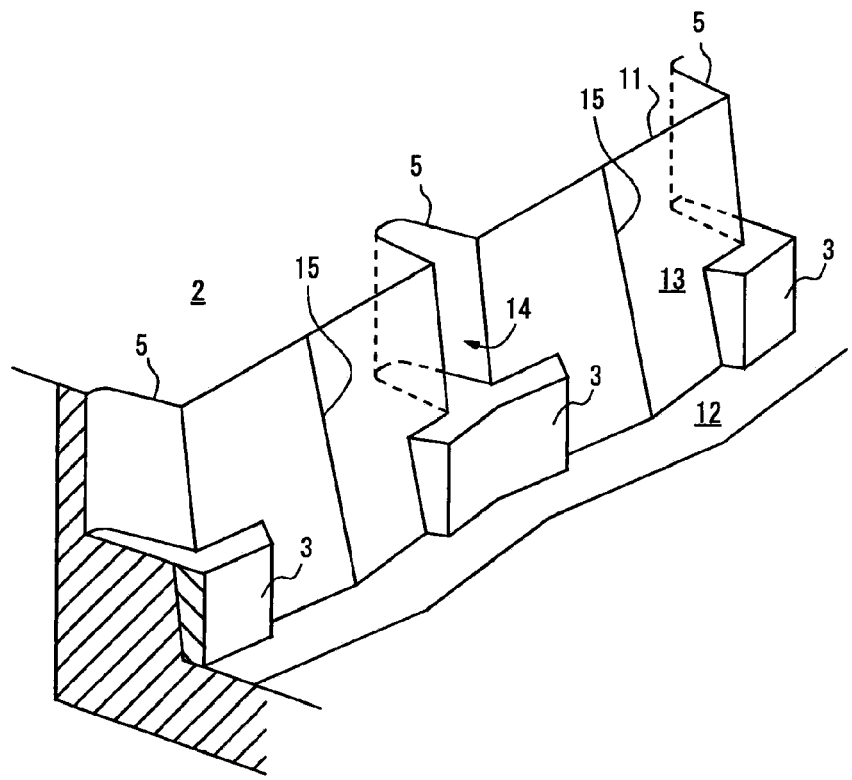
FIG. 6 is an oblique perspective view showing a part of the main groove in FIG. 5.

FIG. 5 is a schematic view showing the tread pattern of the pneumatic tire when the tire is new in another embodiment and FIG. 6 is an oblique perspective view showing a part of the main groove. Although the operational effect of the protrusions 3 is just like that observed in the tires of FIGS. 1 and 2, instead of the sipes, notches 5 extending from the concave portion 14 of the sidewall 13 to the inner side of the rib 2 in the tire width direction are formed. By the notches 5, the rigidity of the concave portions 14 of the sidewall 13 with improved rigidity by the protrusions 3 is lowered as is the case of using the sipes 4. As a result, the difference in the rigidity between the concave portions 14 and the convex portions 15 of the sidewall 13 becomes smaller, which can inhibit the uneven wear. For information, it is preferable that the depth of the notches 5 is the depth that can reach to the protrusions 3, that the length of the notches 5 is 5 to 15% of the width of the rib 2, and that the width that opens to the sidewall 13 of the notches 5 is 2 to 8 mm. When the notches 5 are too short or when the opening width is too narrow, the effect of narrowing the rigidity difference between the concave portions 14 and the convex portions 15 is small. On the other hand, when the notch 5 is too long or when the opening width is too wide, the rigidity of the concave portion 14 becomes too small.

Figure 7:
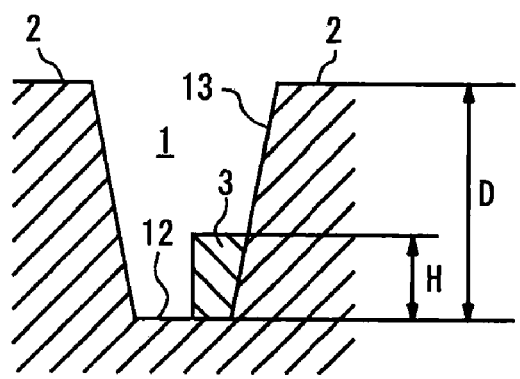
FIG. 7 is a cross-section view taken along the line A-A in FIGS. 1, 3, and 5, respectively.

FIG. 7 is a cross-section view taken along the line A-A in FIGS. 1, 3, and 5, respectively. It is preferable that the height H from the groove bottom 12 of the protrusions 3 is 10 to 40% of the depth D of the main groove 1. When the height H is less than 10% of the depth D, sometimes, the effect of inhibiting the catching of stones is low and when the height H exceeds 40% of the depth D, sometimes, the drainage performance of the main groove 1 is damaged.

Figure 8:
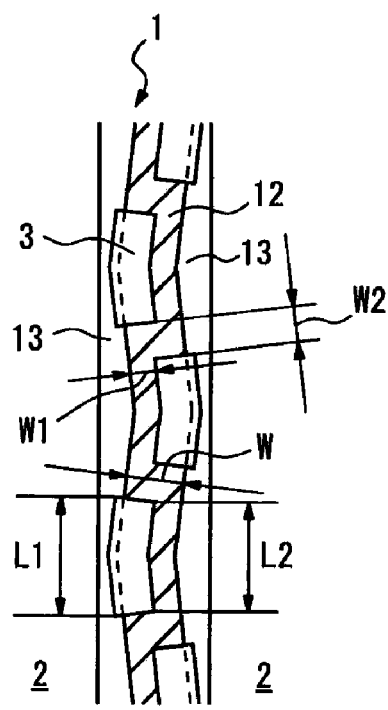
FIG. 8 is an enlarged view showing the bottom of the main groove in FIG. 1.
Figure 9:
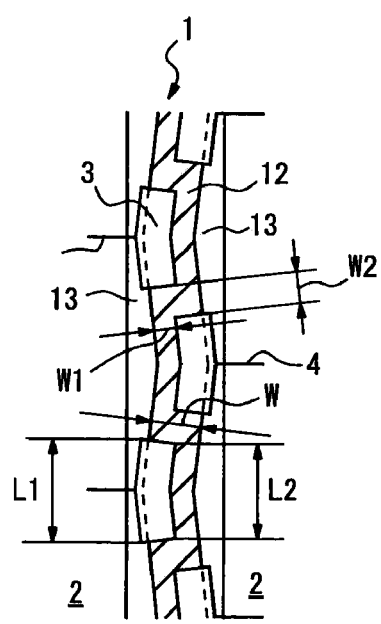
FIG. 9 is an enlarged view showing the bottom of the main groove in FIG. 3.
Figure 10:
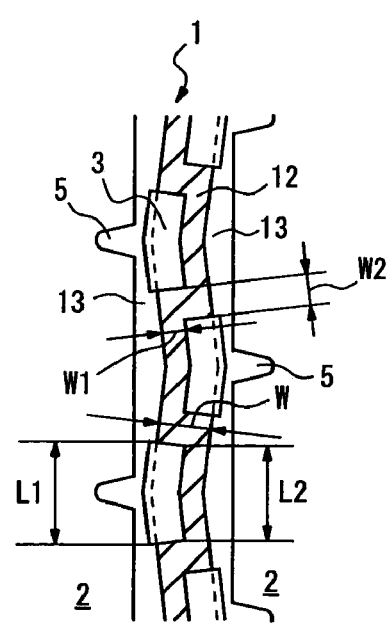
FIG. 10 is an enlarged view of the bottom of the main groove in FIG. 5.

FIGS. 8 to 10 are enlarged views of the bottoms of the main grooves in FIG. 1, FIG. 3, and FIG. 5, respectively and the groove bottoms 12 are shaded. W1 is the distance from the protrusions 3 to the opposing sidewall 13 in the groove bottom. W2 is the space of the adjacent protrusions 3 in the groove bottom. In order to secure the satisfactory drainage performance, it is necessary that there is no great changes in the width of the groove bottom 12. Therefore, it is preferable that the larger value between W1 and W2 is not greater than twice as the smaller value between W1 and W2. In FIGS. 8 to 10, although W2 is larger than W1, depending on the size of the protrusions 3, W1 sometimes becomes larger than W2 or vice versa.

Further, when the groove width in the bottom 12 except the protrusions 3 is defined as W, it is preferable that the smaller value between W1 and W2 is 50 to 70% of W. When the smaller value is less than 50% of W, sometimes the drainage performance is degraded, and when the smaller value exceeds 70% of W, since the protrusions 3 are small, sometimes inhibition of the catching of stones cannot be achieved. Further, from the view point of securing drainage, it is preferable to make L1 shorter than L2 when L2 is defined to be the circumferential length of the protrusions 3 at the farther side from the sidewall 13 and when L1 is defined to be the circumferential length at the near side from the sidewall 13.

EXAMPLE

The pneumatic tires of the present invention of the Examples were test produced and the evaluation was made by installing the tires on a truck with a live load of 10 tons (axle constitution of 2-D). For information, the tread patterns of Examples 1 to 3 were the patterns shown in FIGS. 1, 3, and 5, respectively. The depth D of the main grooves 1 was 14.5 mm, the height H of the protrusion 3 is 3 mm, and W, W1, and W2 in FIGS. 8 to 10 were 7 mm, 4.5 mm, and 6.5 mm, respectively, and L1 and L2 were 23 mm and 17 mm, respectively, and the width of the ribs 2 was 38 mm. The length of the sipes 4 of the Example 2 was 2.5 mm, and the length of the notches 5 of the Example 3 was 4 mm, and the opening width of the notches 5 at the sidewall 13 was 5.5 mm.

The tires of the Conventional Examples 1 to 3 were the tires that had the same patterns as those of the Examples 1 to 3 but were not provided with the protrusions. However, the tire of the Conventional Example 2 is provided with the same sipes of that of the Example 2, and the tire of the Conventional Example 3 is provided with the same notches of that of the Example 3, respectively. Although the tire of the Conventional Example 4 has the same pattern as that of the Example 1, it is the tire with the groove bottom extending in a linear manner and with the protrusions arranged at the center of the groove bottom with the width of 3 mm, height of 3 mm, the circumferential length of 6 mm, and at the spaces of 2 mm. Also, the tire size of all the tires was set to be 11R22.5 and the installed rim size was set to be 22.5×7.50, and the inner pressure was set to be 700 kPa.

According to the Table 1, the tire of the present invention can prevent the generation of catching of stones, while maintaining the drainage performance, and further, capable of improving the traction performance at the time of wear. For information, the evaluation methods in each item shown in the Table 1 are as follows. All are the indexes defining the value in the Conventional Example 1 to be 100, and the greater value shows the good performance.

(1) Drainage Performance

Driving on a wet road with water depth of 3 mm accelerating the speed gradually from 50 km per hour and then showing the speed at which hydro planning phenomena occurred (when the change in response from the steering wheel was felt) and the average value by five drivers were observed.

(2) Traction Performance

Driving on a dried road from 60 km per hour and the braking distance was measured. The shorter braking distance shows the good traction performance.

(3) Performance of Preventing Catching of Stones

After driving 10,000 km on a general road, the number of the stones caught in the main grooves was measured.

TABLE 1

|  | Example 1 | Example 2 | Example 3 | Conventional Example 1 | Conventional Example 2 | Conventional Example 3 | Conventional Example 4 |
| --- | --- | --- | --- | --- | --- | --- | --- |
| Drainage performance when the tire is new | 100 | 100 | 100 | 100 | 100 | 100 | 100 |
| Traction performance when the tire is new | 100 | 100 | 100 | 100 | 100 | 100 | 100 |
| Drainage performance with 80% wear | 95 | 95 | 95 | 100 | 100 | 100 | 60 |
| Traction performance with 80% wear | 110 | 110 | 110 | 100 | 100 | 100 | 90 |
| Catching of stones prevention performance | 120 | 120 | 120 | 100 | 100 | 100 | 135 |

What is claimed is:

1. A pneumatic tire with not less than three main grooves extending in the tire circumferential direction, and ribs formed by two of the main grooves, wherein upper edges of at least one of the main grooves when the tire is new extend in a linear manner in the tire circumferential direction, the bottom of the at least one of the main grooves extends in a zigzag manner in the tire circumferential direction, the sidewalls of the at least one of the main grooves are provided with concave portions and convex portions, in the concave portions of at least one of the sidewalls of the at least one of the main grooves, protrusions that are joined to the bottom of the at least one of the main grooves and to the sidewall are provided, and the pneumatic tire is provided with notches that extend from the concave portions to the inner side of the rib in the tire width direction and the width of the notches gradually narrows from the concave portions to the inner side of the rib.

2. The pneumatic tire as set forth in claim 1, provided with the protrusions at both sidewalls of the at least one of the main grooves.

3. The pneumatic tire as set forth in claim 1, wherein height H from the groove bottom of the protrusions is 10 to 40% of depth D of the at least one of the main grooves.

4. The pneumatic tire as set forth in claim 1, wherein W1 is defined as the distance from a protrusion to the opposing sidewall in the groove bottom and W2 is defined as the space between adjacent protrusions, when taking into account the opposing sidewalls, in the groove bottom, the larger value between W1 and W2 is not greater than twice the other value, and the smaller value between W1 and W2 is 50 to 70% of the groove width W in the groove bottom except for the protrusions.

5. The pneumatic tire as set forth in claim 1, wherein the circumferential length L2 of the protrusions at the farther side from the sidewall is shorter than the circumferential length L1 of the protrusions at the near side from the sidewall.

6. The pneumatic tire as set forth in claim 1, wherein the width of the notches that opens to the sidewall is 2 mm to 8 mm.

7. The pneumatic tire as set forth in claim 1, wherein the notches extend from a tread surface to the protrusions.

8. The pneumatic tire as set forth in claim 1, wherein the notches are present in the sidewall only at the concave portions.

9. A pneumatic tire with not less than three main grooves extending in the tire circumferential direction, and ribs formed by two of the main grooves, wherein upper edges of at least one of the main grooves when the tire is new extend in a linear manner in the tire circumferential direction, the bottom of the at least one of the main grooves extends in a zigzag manner in the tire circumferential direction, the sidewalls of the at least one of the main grooves are provided with concave portions and convex portions, in the concave portions of at least one of the sidewalls of the at least one of the main grooves, protrusions that are joined to the bottom of the at least one of the main grooves and to the sidewall are provided, and the pneumatic tire is provided with sipes that extend from the concave portions to the inner side of the rib in the tire width direction and that are present in the sidewall only at the concave portions.

10. The pneumatic tire as set forth in claim 9, provided with the protrusions at both sidewalls of the at least one of the main grooves.

11. The pneumatic tire as set forth in claim 9, wherein height H from the groove bottom of the protrusions is 10 to 40% of depth D of the at least one of the main grooves.

12. The pneumatic tire as set forth in claim 9, wherein W1 is defined as the distance from a protrusion to the opposing sidewall in the groove bottom and W2 is defined as the space between adjacent protrusions, when taking into account the opposing sidewalls, in the groove bottom, the larger value between W1 and W2 is not greater than twice the other value, and the smaller value between W1 and W2 is 50 to 70% of the groove width W in the groove bottom except for the protrusions.

13. The pneumatic tire as set forth in claim 9, wherein the circumferential length L2 of the protrusions at the farther side from the sidewall is shorter than the circumferential length L1 of the protrusions at the near side from the sidewall.

\* \* \* \* \*